United States Patent [19]
Yasumura et al.

[11] Patent Number: 5,626,109
[45] Date of Patent: May 6, 1997

[54] VALVE TIMING CONTROL APPARATUS FOR ENGINE

[75] Inventors: Atsushi Yasumura, Toyota; Senji Kato, Aichi-ken; Nobuhisa Ohkawa, Toyota, all of Japan

[73] Assignee: Toyota Jidosha Kabushiki Kaisha, Toyota, Japan

[21] Appl. No.: 625,267

[22] Filed: Mar. 29, 1996

[30] Foreign Application Priority Data

Mar. 31, 1995 [JP] Japan .................... 7-076333

[51] Int. Cl.$^6$ .................. F01L 1/34; F02D 13/02
[52] U.S. Cl. .................... 123/90.15; 123/90.17; 123/90.31
[58] Field of Search ............... 123/90.15, 90.16, 123/90.17, 90.31

[56] References Cited

U.S. PATENT DOCUMENTS

| | | | |
|---|---|---|---|
| 5,103,780 | 4/1992 | Ishii | 123/90.15 |
| 5,280,770 | 1/1994 | Satou et al. | 123/90.15 |
| 5,333,577 | 8/1994 | Shinojima | 123/90.15 |
| 5,398,502 | 3/1995 | Watanabe | 123/90.15 |
| 5,417,191 | 5/1995 | Togai et al. | 123/90.15 |
| 5,482,012 | 1/1996 | Yoshioka | 123/90.15 |

FOREIGN PATENT DOCUMENTS

| | | |
|---|---|---|
| 4015226 | 11/1991 | Germany . |
| 2-115537A | 4/1990 | Japan . |
| 4-228843A | 8/1992 | Japan . |

*Primary Examiner*—Weilun Lo
*Attorney, Agent, or Firm*—Kenyon & Kenyon

[57] ABSTRACT

A valve timing control apparatus that adjusts valve overlap by altering valve timing according to the running condition of the engine. A variable valve timing mechanism (VVT) alters the valve timing of intake valves to adjust the valve overlap. An electronic control unit (ECU) controls the VVT with respect to a target value calculated in accordance to the running condition of the engine to obtain the optimum valve overlap. The ECU controls the VVT to eliminate valve overlap under low temperature conditions. The ECU controls the VVT to switch from a state of nonexistent valve overlap to a valve overlap state as the temperature changes from a low temperature to a higher temperature. The ECU judges whether the engine is in a low temperature condition based on a predetermined reference value to suppress the difference in the amount of fuel (port wet amount) adhered to the intake port before and after the shifting of the state the valve overlap.

22 Claims, 9 Drawing Sheets

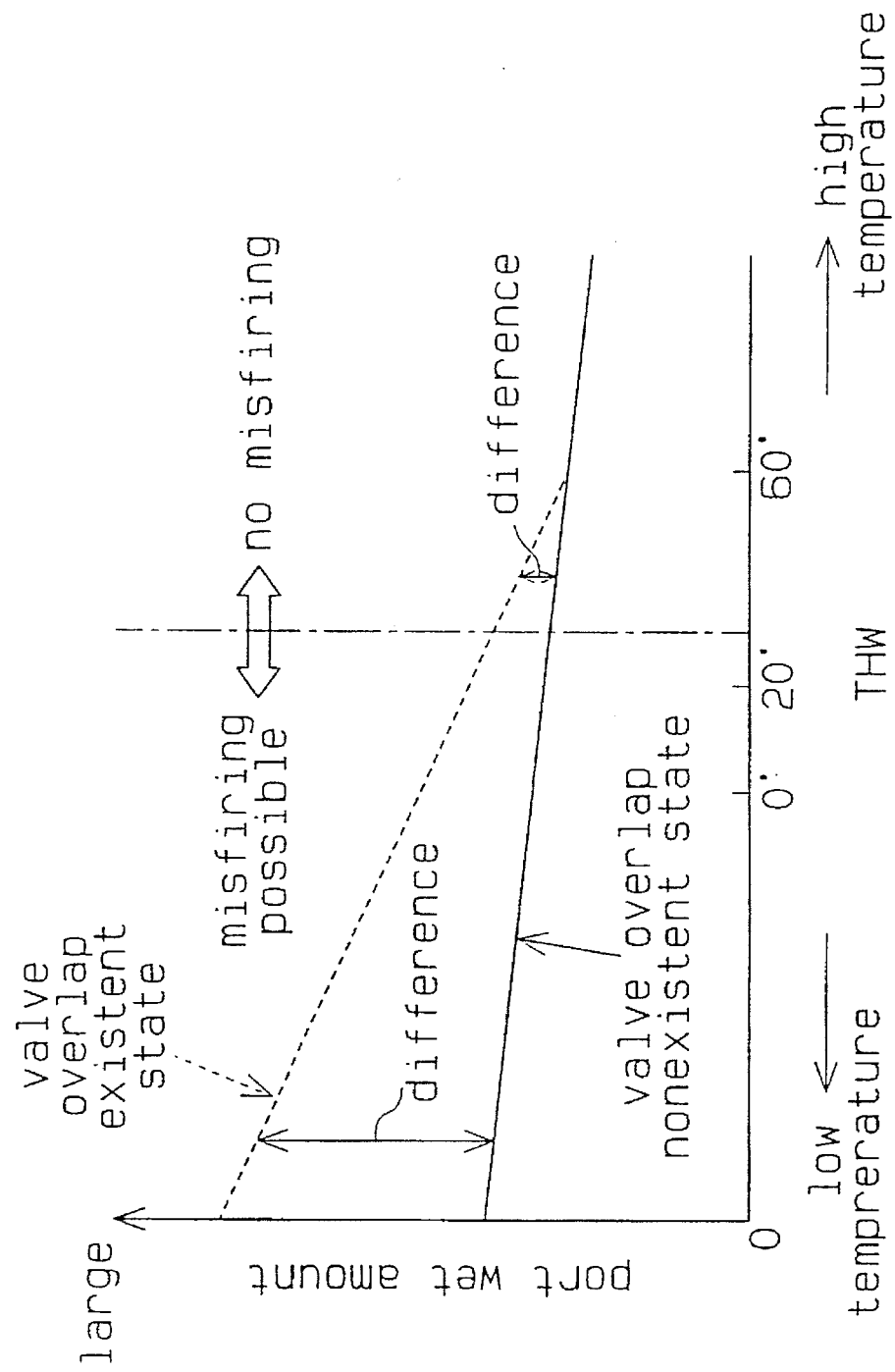

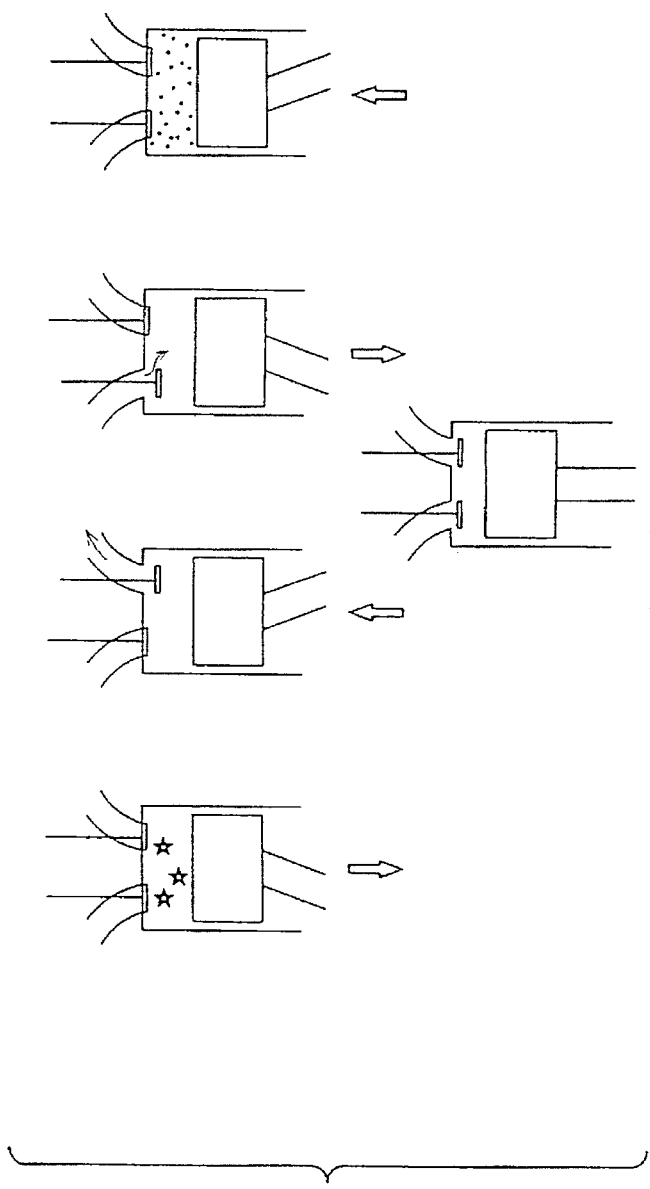
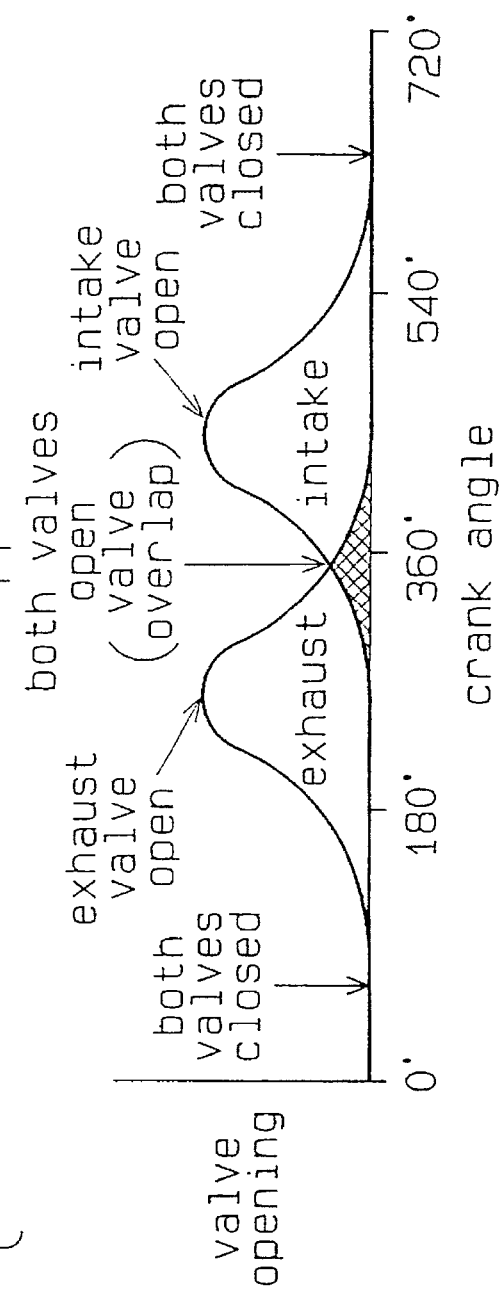
Fig.9(a) (Prior Art)
Fig.9(b) (Prior Art)

VALVE TIMING CONTROL APPARATUS FOR ENGINE

BACKGROUND OF THE INVENTION

1. Field of the Invention

The present invention relates generally to a valve timing control apparatus that controls the timing of the intake or exhaust valves of an engine in accordance with the running condition of the engine. More particularly, the present invention pertains to a valve timing control apparatus that controls the valve timing to adjust the valve overlap.

2. Description of the Related Art

A conventional engine generally has intake and exhaust valves, which selectively open and close intake ports and exhaust ports leading into combustion chambers. The timing of the valves is synchronized with the rotational phase of a crankshaft, or the reciprocal movement of pistons. The amount of gas drawn into the combustion chambers (intake amount) and the amount of exhaust gas discharged from the combustion chambers (exhaust amount) are determined by the opening of a throttle valve or the engine speed. As shown in FIG. 9(a) and 9(b), during a cycle in which the crankshaft is rotated for an angle of 720 degrees, there is a range where the intake and exhaust valves of each combustion chamber are opened at the same time. This so-called valve overlap assists in the intake of the air-fuel mixture into the combustion chamber and the exhaustion of the combusted gas from the combustion chamber.

Various control apparatuses that enable alteration of the valve timing to adjust the intake and exhaust amount with a greater degree of freedom have recently become available. Such apparatuses typically include a variable valve timing mechanism for alteration of the valve timing and a computer to control the operation of the timing mechanism. The computer controls the valve timing of either the intake valve or the exhaust valve in accordance with the running condition of the engine to adjust the valve overlap of the intake and exhaust valves. This enables the air-fuel ratio of the air-fuel mixture drawn into the combustion chamber to be adjusted to an appropriate value and thus enables the power of the engine to be controlled.

For instance, when the engine speed is relatively high, the computer relatively prolongs the valve overlap range with the timing mechanism. This improves the engine power by enhancing the charging efficiency of the intake gas in the combustion chambers with the inertia effect of the air flowing in from an air intake passage. When the engine speed is rather low, the computer relatively shortens the valve overlap range with the timing mechanism. This prevents a reversed flow of the exhaust gas discharged from each combustion chamber. Thus, the reduced amount of residual gas in each combustion chamber, or the lowered ratio of internal exhaust gas recirculation (EGR), prevents insufficient combustion of the air-fuel mixture.

An example of such a control apparatus is described in Japanese Unexamined Patent Publication No. 4-228843. The apparatus controls the valve timing of the intake and exhaust valves in accordance with the running condition of the engine. As shown in FIG. 10, the control apparatus includes an electronic control unit (ECU) 91 which controls first, second, third, and fourth electromagnetic valves 96, 97, 98, 99 in response to values detected by engine speed, intake pressure, vehicle velocity, and coolant temperature sensors 92, 93, 94, 95. This enables the ECU 91 to control timing pulley assemblies 102, 103, which alter the rotational phase of the associated cam shafts 100, 101. Consequently, the valve timing of each intake and exhaust valve (not shown) is altered and the valve overlap is adjusted.

The ECU 91 judges how warm the engine is from the coolant temperature. The ECU 91 controls the electromagnetic valves 96, 97, 98, 99 to eliminate the valve overlap when it determines that the coolant temperature is lower than a predetermined reference value. This prevents air-fuel mixture and combusted gas (exhaust gas) from simultaneously entering the engine's combustion chambers (not shown). Thus, the fuel mist suspended in the air-fuel mixture is prevented from adhering to spark plugs and thus does not interfere with ignition of the spark plugs despite the low temperature.

Elimination of valve overlap under low temperature conditions not only contributes to better ignition of the spark plugs, but also suppresses the amount of the so-called port wet. Port wet is a state in which fuel adheres to the walls of intake ports that lead into combustion chambers. In this case, port wet especially refers to the fuel that adheres to the walls of the intake ports due to a reversed flow of air-fuel mixture from the combustion chambers. This prevents the air-fuel ratio of the mixture in the combustion chamber from being changed to an undesirable value and thus enables a reduction of hydrocarbon (HC) in the exhaust gas.

However, in the above prior art control apparatus, the ECU 91 determines the state of valve overlap by judging whether the temperature is low by merely comparing it with a predetermined reference value. Therefore, switching from a non-overlap state to an overlap state may create undesirable engine running conditions. In other words, there is a difference in the amount of port wet when comparing a valve overlap state and a non-overlap state. Additionally, the difference between the port wet amount in both states changes according to the coolant temperature. Therefore, switching the state of the valve overlap by merely judging whether the temperature is lower than a reference value may cause formation of an excessive amount of port wet after the switching. In such cases, the amount of fuel supplied to the combustion chambers after the valve overlap switching may be insufficient and result in an undesirable air-fuel ratio inside the combustion chamber. This leads to a degradation in the engine performance and emissions.

SUMMARY OF THE INVENTION

Accordingly, it is a primary objective of the present invention to provide a valve timing control apparatus for an engine that prevents fuel from adhering to the walls of an intake passage to maintain the air-fuel ratio in combustion chambers at a preferable level by eliminating valve overlap during low temperature conditions while also minimizing the difference in the amount of fuel adhering to the walls of the intake passage before and after switching from a valve overlap nonexistent state to a valve overlap existent state so as to maintain the air-fuel ratio of the air-fuel mixture in the combustion chambers at a preferable level.

To achieve the foregoing and other objects and in accordance with the purpose of the present invention, a valve timing control apparatus for an engine is provided. The engine has a combustion chamber for combusting a mixture of fuel mist and air therein, an air intake passage for introducing the air to a combustion chamber and exhaust passage for exhausting gas from the combustion chamber. The passages respectively have an intake valve and an exhaust valve therein. The intake valve and the exhaust valve are actuated in synchronism with the rotation of a crank shaft of the engine to be alternately opened and closed to regulate introduction of the air to and exhausting of the gas from the combustion chamber and to be simultaneously open during a valve overlap period causing a reverse flow of the air-fuel mixture from the combustion chamber to the air intake passage. The fuel mist adheres to an inner surface of the air intake passage. The apparatus comprises adjusting device for adjusting the valve timing at least one of the intake valve and the exhaust valve to obtain a valve overlap mode in which the valve timing is optimized and a non-overlap mode in which valve overlap is eliminated. The apparatus comprises condition detecting device for detecting a running condition of the engine, first control device for controlling the adjusting device to operate within the valve overlap mode based on the detected running condition. The apparatus comprises temperature detecting device for detecting a temperature of the engine, second control device for controlling the adjusting device to operate in the non-overlap mode when the detected engine temperature is below a predetermined value. The apparatus comprises selecting device for selecting the valve overlap mode in place of the non-overlap mode by deactivating the second control device and actuating the first control device when the detected temperature is in excess of the predetermined value. The predetermined value is based on a value selected such that the adhered fuel mist is substantially unchanged in amount before and after the valve timing is changed to the overlap mode from the non-overlap mode.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 8 is a graph showing the relationship between coolant temperature and the amount of port wet;

FIGS. 9(a) and 9(b) are the explanatory diagrams showing the relationship of valve operation and valve overlap.

DETAILED DESCRIPTION OF THE PREFERRED EMBODIMENT

An engine valve timing control apparatus, employed in an automobile gasoline engine system, according to a preferred embodiment of the present invention will now be described with reference to FIGS. 1 through 8.

Figure 1:
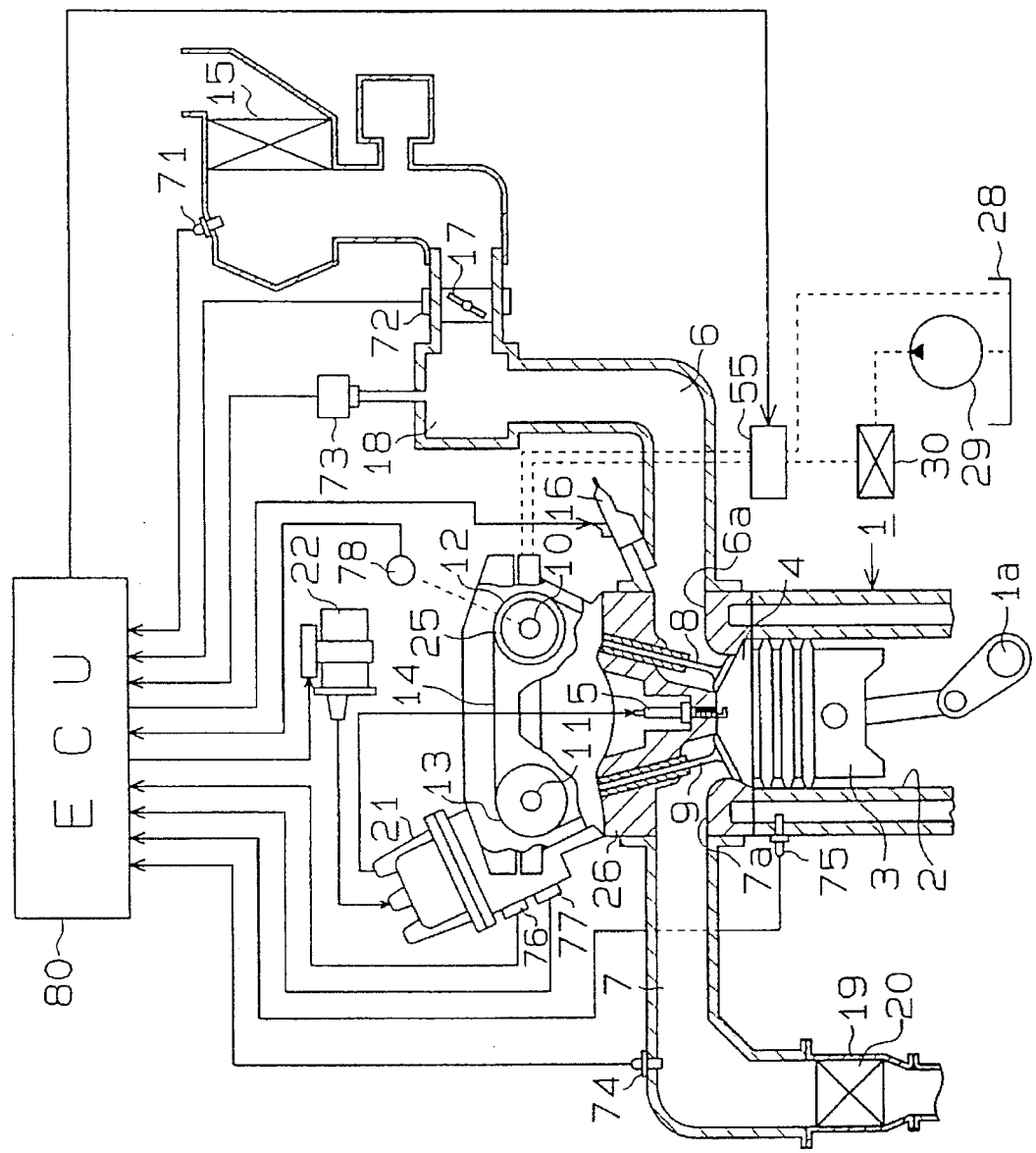
FIG. 1 is a diagrammatic structural drawing showing a gasoline engine system according to the present invention.

FIG. 1 is a diagrammatic structural drawing showing a gasoline engine system of this embodiment. Engine 1 has a plurality of cylinders 2. Each cylinder 2 retains a piston 3. The piston 3 is connected to a crank shaft 1a and reciprocates inside the cylinder 2. A combustion chamber 4 is defined in each cylinder 2 above the piston 3. A spark plug 5 provided for each combustion chamber 4 ignites air-fuel mixture, which is drawn into the chamber 4. An intake port 6a, which is a portion of an intake passage 6, and an exhaust port 7a, which is a portion of an exhaust passage 7, are provided for each combustion chamber 4. An intake valve 8 and an exhaust valve 9, provided for each combustion chamber 4, selectively open and close the associated intake and exhaust ports 6a, 7a. The valves 8, 9 are operated in accordance with the rotation of cam shafts 10, 11, respectively. A timing belt 14 connects timing pulleys 12, 13, which are provided on the distal end of the associated cam shafts 10, 11, with a crank shaft 1a.

The torque of the crank shaft 1a is transmitted to the cam shafts 10, 11 through the belt 14 and the pulleys 12, 13 during operation of the engine 1. Rotation of the cam shafts 10, 11 moves the valves 8, 9. The valves 8, 9 are operated in accordance with a predetermined timing, which is synchronized with the rotation of the crank shaft 1a. That is, the valves 8, 9 are synchronized with the suction, compression, combustion and expansion, and exhaust strokes of the associated piston 3.

An air cleaner 15, located in the inlet of the intake passage 6, purifies the ambient air drawn into passage 6. An injector 16 provided in the vicinity of each intake port 6a injects fuel, supplied from a fuel supply device (not shown), through the port 6a. During operation of the engine 1, ambient air is drawn into the intake passage 6 and passes through the air cleaner 15. The air mixes with the fuel injected from the injector 16 into an air-fuel mixture and is then drawn into the combustion chamber 4 when the intake valve 8 opens the intake port 6a during the suction stroke. Ignition of the spark plug 5 combusts the mixture in the combustion chamber 4. This moves the piston 3 and rotates the crank shaft 1a thus obtaining power. After combustion is completed, the exhaust gas is discharged from the combustion chamber 4 and emitted into the atmosphere through the exhaust passage 7 when the exhaust valve 9 opens the exhaust port 7a during the exhaust stroke.

A throttle valve 17, provided in the intake passage 6, is operated in accordance with an accelerator pedal (not shown). By adjusting the opening of the valve 17, the amount of air introduced into the intake passage 6, or the intake air amount Q is adjusted. A surge tank 18, provided downstream of the throttle valve 17, smoothens the pulsation of the drawn in air. An intake air temperature sensor 71, located near the air cleaner 15, detects the intake air temperature THA and transmits a signal based on the detected value. A throttle position sensor 72, located near the throttle valve 17, detects the opening (throttle opening) TA of the valve 17 and transmits a signal based on the detected value. An intake air pressure sensor 73, provided in the surge tank 18, detects the pressure of the intake air (intake pressure) PM and transmits a signal based on the detected value.

A catalytic converter 19, with an incorporated three-way catalyst 20, is provided in the exhaust passage 7 to purify the exhaust gas with the catalyst 20. An oxygen sensor 74, provided in the intake passage 7, detects the oxygen density Ox of the exhaust gas and transmits a signal based on the detected value. A coolant temperature sensor 75, provided in the engine 1, detects the temperature of the coolant which is used to cool the engine 1. The temperature sensor 75 transmits a signal based on the detected value of the coolant temperature THW.

A distributor 21 distributes high voltage signal from an ignitor 22 to each spark plug 5 and ignites the plug 5. Accordingly, the ignition timing of the plugs 5 is determined by the timing at which the ignitor 22 releases high voltage.

A rotor (not shown) incorporated in the distributor 21 is rotated by the cam shaft 11, which rotates in synchronism with the crank shaft 1a. An engine speed sensor 76, provided in the distributor 21 detects the revolution speed of the engine 1 (engine speed) ME from the rotor's rotation and transmits a pulse signal as the detected value. A timing sensor 77, provided in the distributor 21, detects a crank angle reference position GP from the rotor's rotation at a predetermined rate and transmits a pulse signal as the detected value. In this embodiment, the crank shaft 1a completes two rotations for each cycle consisting of the four strokes. During the two rotations of the crank shaft 1a, the speed sensor 76 transmits a single pulse signal per crank angle of 30 degrees. The timing sensor 77 transmits a pulse signal per crank angle of 360 degrees.

In this embodiment, a variable valve timing mechanism (VVT) 25, provided in the pulley 12, enables the valve timing of the intake valves 8 to be altered. The VVT 25 is driven by hydraulic pressure. The VVT 25 and a hydraulic unit, employed to drive the VVT 25, will now be described with reference to FIGS. 2, 3, 5(a), and 5(b).

Figure 2:
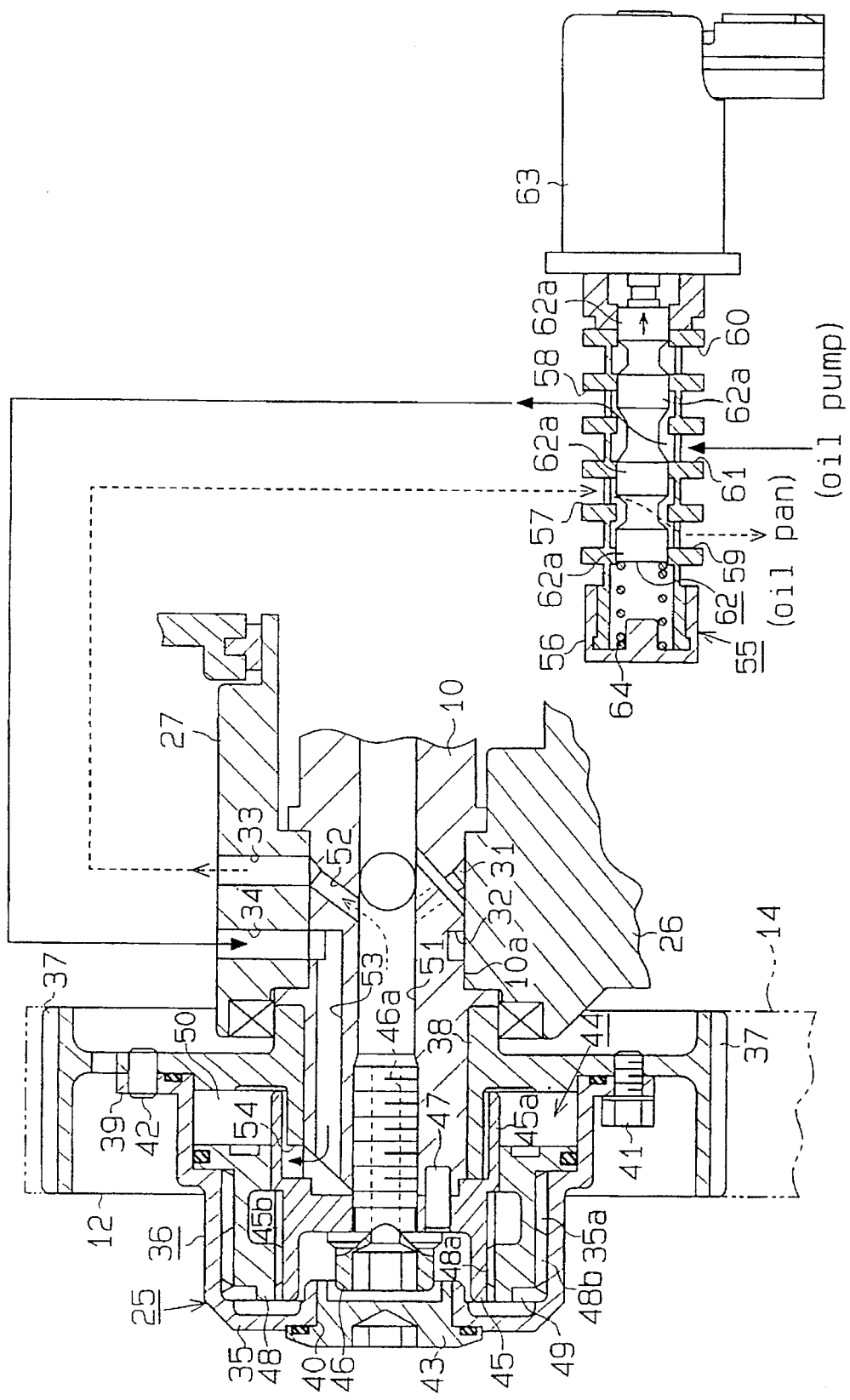
FIG. 2 is a cross-sectional view showing the structure of a variable valve timing (VVT) and a linear solenoid valve (LSV)
Figure 3:
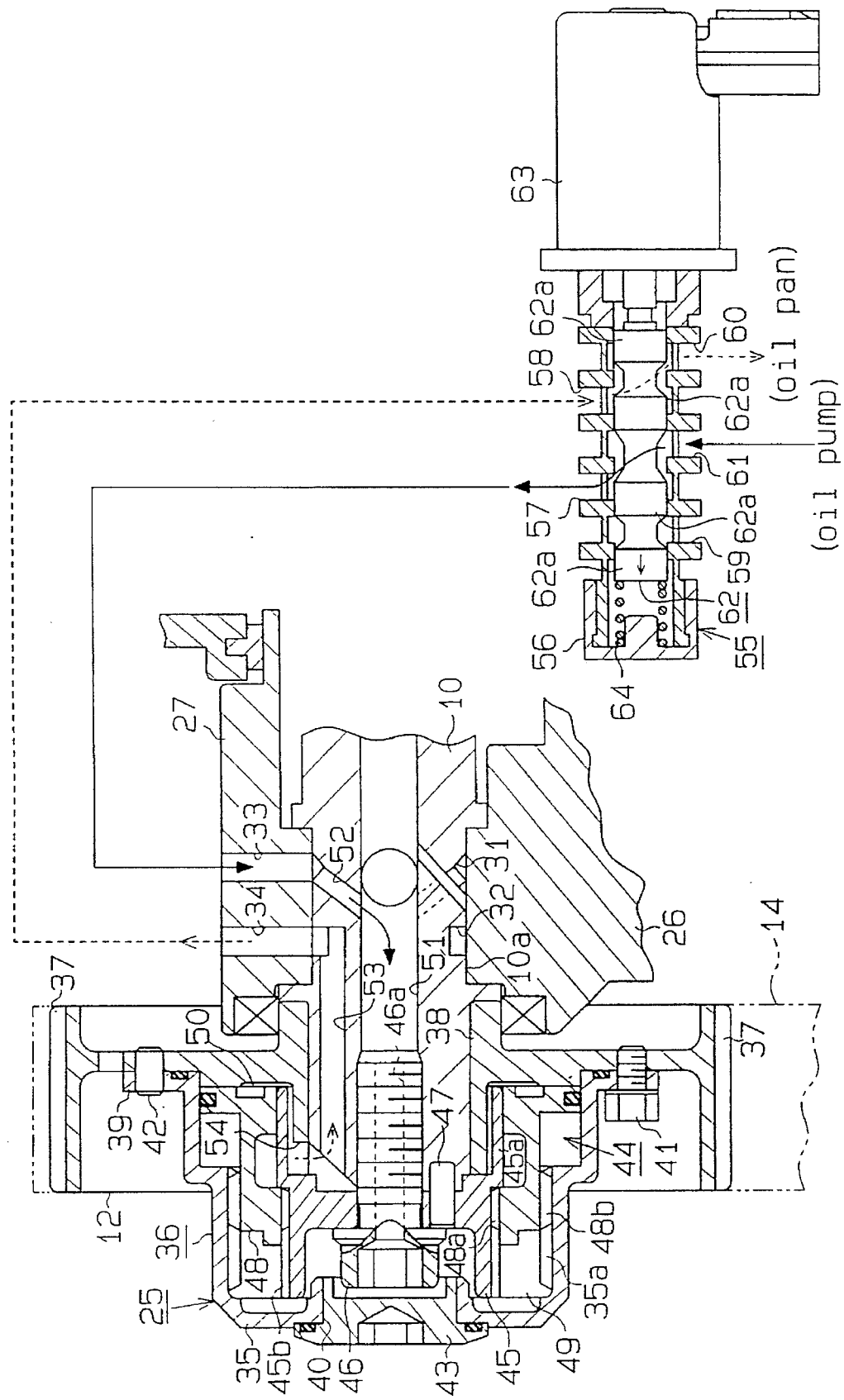
FIG. 3 is a cross-sectional view also showing the structure of the VVT and the LSV.

FIGS. 2 and 3 show the structure of the VVT 25 and a linear solenoid valve (LSV) 55, which is provided with the VVT 25. A cylinder head 26 and a bearing cap 27 rotatably support the cam shaft 10 at its journal 10a. The VVT 25 and the pulley 12, provided on the distal end of the cam shaft 10, constitute a single unit. Two oil grooves 31, 32 extend along the outer surface of the journal 10a. Oil passages 33, 34 defined in the bearing cap 27 supply lubricating oil to the journal 10a and the associated grooves 31, 32. As shown in FIG. 1, an oil pan 28, a lubricating oil pump 29, an oil filter 30, etc., which are provided in the engine 1, constitute a lubricating device for lubrication of the components in the engine 1.

Activation of the oil pump 29, in accordance with the operation of the engine 1, causes lubricating oil contained in the oil pan 28 to be drawn into and then discharged from the pump 29. The discharged oil passes through the oil filter 30. The LSV 55 then pressurizes the oil and selectively sends it to the grooves 31, 32 and the journal 10 through oil passages 33, 34.

The pulley 12 and a cover 35 attached to the pulley 12 constitute a housing 36. The cover 35, which is cylindrical and has a bottom wall, encompasses one side of the pulley 12 and the distal end of the cam shaft 10. The pulley 12 has a plurality of teeth 37 on its peripheral surface and a boss 38 at its center. The pulley 12, the boss 38 of which is mounted on the cam shaft 10, is relatively rotatable with respect to the shaft 10. The timing belt 14 is meshed with the teeth 37.

The cover 35 has a flange 39 on its peripheral wall and a hole 40 at its center. A plurality of bolts 41 and pins 42 fasten the flange 39 to one side of the pulley 12. A detachable cap 43 is mounted in the hole 40. The cover 35 has a plurality of inner teeth 35a on its inner surface.

A space 44 is defined between the pulley 12 and the cover 35. An inner cap 45 is retained in the space 44. The cap 45 is secured to the distal end of the cam shaft 10 by a hollow bolt 46 and a pin 47. The peripheral wall 45a of the cap 45 encompasses the boss 38. The cap 45 and the boss 38 are relatively rotatable with respect to each other. A plurality of outer teeth 45b are provided on the outer surface of the peripheral wall 45a.

A ring gear 48 located between the cover 35 and the cap 45 connects the housing 36 with the cam shaft 10. The annular ring gear 48 is retained in the space 44 and is movable along the axis of the cam shaft 10. The ring gear 48 has a plurality of helical teeth 48a, 48b on its inner and outer periphery. This allows relative rotation of the gear 48 with respect to the cam shaft 10 as it moves along the axis of the shaft 10. The inner teeth 48a of the ring gear 48 are meshed with the outer teeth 45b of the cap 45, and the outer teeth 48b of the gear 48 are meshed with the inner teeth 35a of the cover 35.

Rotation of the pulley 12 rotates the cover 35 and the cap 43, which are connected to each other by the gear 48. Thus, the cam shaft 10 and the housing 36 rotate integrally with each other.

As shown in FIGS. 2 and 3, the space 44 includes first and second hydraulic pressure chambers 49, 50 which are partitioned by the ring gear 48. The first pressure chamber 49 is defined between the left end of the gear 48 and the bottom wall of the cover 35. The second pressure chamber 50 is defined between the right end of the gear 48 and the pulley 12.

An oil passage 51 extends inside the cam shaft 10 along its axis to supply lubricating oil to the first pressure chamber 49. The passage 51 is connected with the first pressure chamber 49 by a hole 46a extending through the bolt 46. The passage 51 is connected to the oil groove 31 through an oil hole 52 extending in the radial direction of the cam shaft 10.

An oil passage 53, extending parallel to the oil passage 51, inside the cam shaft 10, supplies lubricating oil to the second pressure chamber 50. An oil hole 54 formed in the boss 38 connects the second pressure chamber 50 with the passage 53.

In the above structure, the oil passage 33, the oil hole 52, the oil passage 51, the hole 46a, etc. constitute a first pressurizing passage, which applies hydraulic pressure to the first pressure chamber 49 with lubricating oil. The oil passage 34, 53, the oil hole 54, etc. constitute a second pressurizing passage, which supplies hydraulic pressure to the second pressure chamber 50 with lubricating oil. Duty control of the opening of the LSV 55, which both pressurizing passages extends through, adjusts the hydraulic pressure applied to the pressure chambers 49, 50. The connecting relation between the LSV 55 and the oil pan 28, oil pump 29, and oil filter 30 is shown in FIG. 1.

As shown in FIGS. 2 and 3, a casing 56 of the LSV 55 includes first, second, third, fourth, and fifth ports 57, 58, 59, 60, 61. The first port 57 is connected to the oil passage 33. The second port 58 is connected to the oil passage 34. The third and fourth ports 59, 60 are connected to the oil pan 28. The fifth port 61 is connected to the discharge side of the oil pump 29 with the oil filter 30 located in between. A stick-like spool 62 provided in the casing 56 has four cylindrical valve bodies 62a. The spool 62 moves reciprocally along its axis. An electromagnetic solenoid 63 provided on the casing 56 moves the spool 62 between a first operable position, shown in FIG. 2, and a second operable position, shown in FIG. 3. A spring 64 provided in the casing 56 urges the spool 62 toward the first operable position.

As shown in FIG. 3, when the spool 62 is arranged at the second operable position against the urging force of the spring 64, the discharge side of the pump 29 is connected with the oil passage 33, and the oil passage 34 is connected to the oil pan 28. This applies hydraulic pressure to the first pressure chamber 49 and thus moves the ring gear 48 in the axial direction while rotating it and urging against the residual oil in the second pressure chamber 50. As a result, the relative rotational phase between the cam shaft 10 and the housing 36 is altered with the phase of the shaft 10 being more advanced than the phase of the housing 36. Consequently, the valve timing of the intake valve 8 is more advanced than the rotational phase of the crank shaft 1a.

Figure 5A:
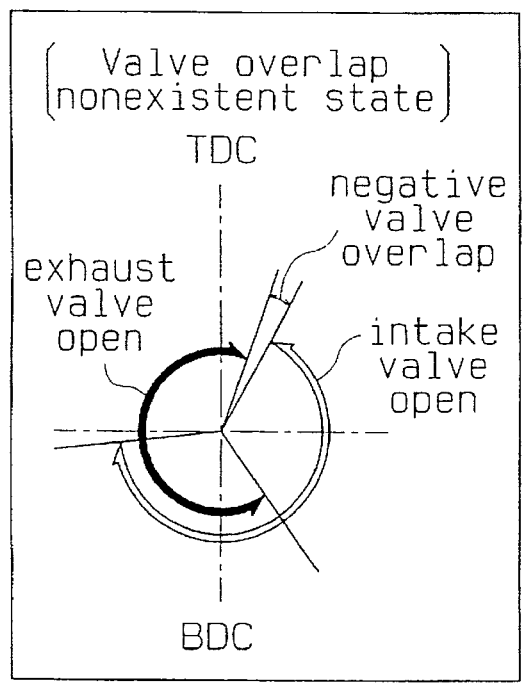
FIGS. 5(a) and 5(b) are explanatory drawings showing the alteration of valve overlap.
Figure 5B:
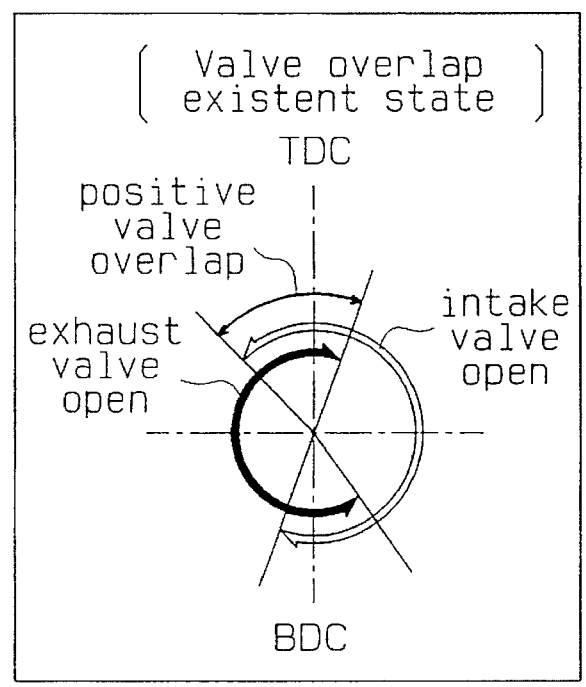

In this state, as shown in FIG. 5(b), the valve timing of the intake valve 8 is relatively advanced and thus the valve overlap of the intake and exhaust valves 8, 9 during the suction stroke becomes relatively greater. FIG. 5(b) shows the opening of the valves 8, 9 with respect to the reciprocation of the piston 3 between the top dead center TDC and the bottom dead center BDC during the four strokes. In the state of FIG. 5(b), a valve overlap exists. Such condition is referred to as "positive valve overlap". By controlling the hydraulic pressure applied to the first pressure chamber 49 in the above manner, the ring gear 48 is moved to a position nearmost to the pulley 12, as shown in FIG. 3. When the gear 48 is at the position nearest to the pulley 12 as in FIG. 3, the valve timing of the intake valve 8 is most advanced and the valve overlap is greatest.

As shown in FIG. 2, when the spool 62 is arranged at the first operable position, the discharge side of the pump 29 is connected with the oil passage 34 and the oil passage 33 is connected to the oil pan 28. This provides hydraulic pressure to the second pressure chamber 50 and moves the ring gear 48 in the axial direction while rotating it against the residual oil in the first pressure chamber 49. As a result, the relative rotational phase between the cam shaft 10 and the housing 36 is changed in a direction opposite to the direction when the spool 62 is at the second operable position. In this state, the rotational phase of the cam shaft 10 is retarded from the rotational phase of the housing 36. Consequently, the valve timing of the intake valve 8 is more retarded than the rotational phase of the crank shaft 1a.

In this state, as shown in FIG. 5(a), the valve timing of the intake valve 8 is relatively retarded and thus the valve overlap during the suction stroke becomes relatively smaller. In this embodiment, valve overlap is nonexistent in this state. When the valve timing of the intake valve 8 is most retarded, the opening of the intake valve 8 is retarded for a predetermined period of time after the exhaust valve 9 is closed. Such condition is referred to as "negative valve overlap". By controlling the hydraulic pressure applied to the second hydraulic pressure chamber 50 in the above manner, the ring gear 48 is moved to a position farmost from the pulley 12, as shown in FIG. 2. When the gear 48 is at this position, the valve timing of the intake valve 8 is most retarded and negative valve overlap exists.

By adequately controlling the VVT 25 in the above manner, the valve timing of the intake valve B, and consequently, the valve overlap, may be changed continuously (steplessly) within the range between the states shown in FIGS. 5(a) and (b).

As shown in FIG. 1, a cam sensor 78, provided with the cam shaft 10, detects the actual displaced angle VT with respect to the rotation of the shaft 10 and transmits a signal based on the detected value. The cam sensor 78 includes a plurality of equally spaced projections arranged on the shaft 10 and a plurality of pick-up coils arranged in correspondence with the projections. An electromotive force is produced in the pick-up coils when rotation of the cam shaft 10 causes the projections to pass by the coils. The cam sensor 78 transmits a pulse signal which shows the actual displacement angle VT according to the electromotive force.

As shown in FIG. 1, an electronic control unit (ECU) 80 receives the signals transmitted from the sensors 71-78. The ECU 80 controls the members 16, 22, 55 in response to the signals.

Figure 4:
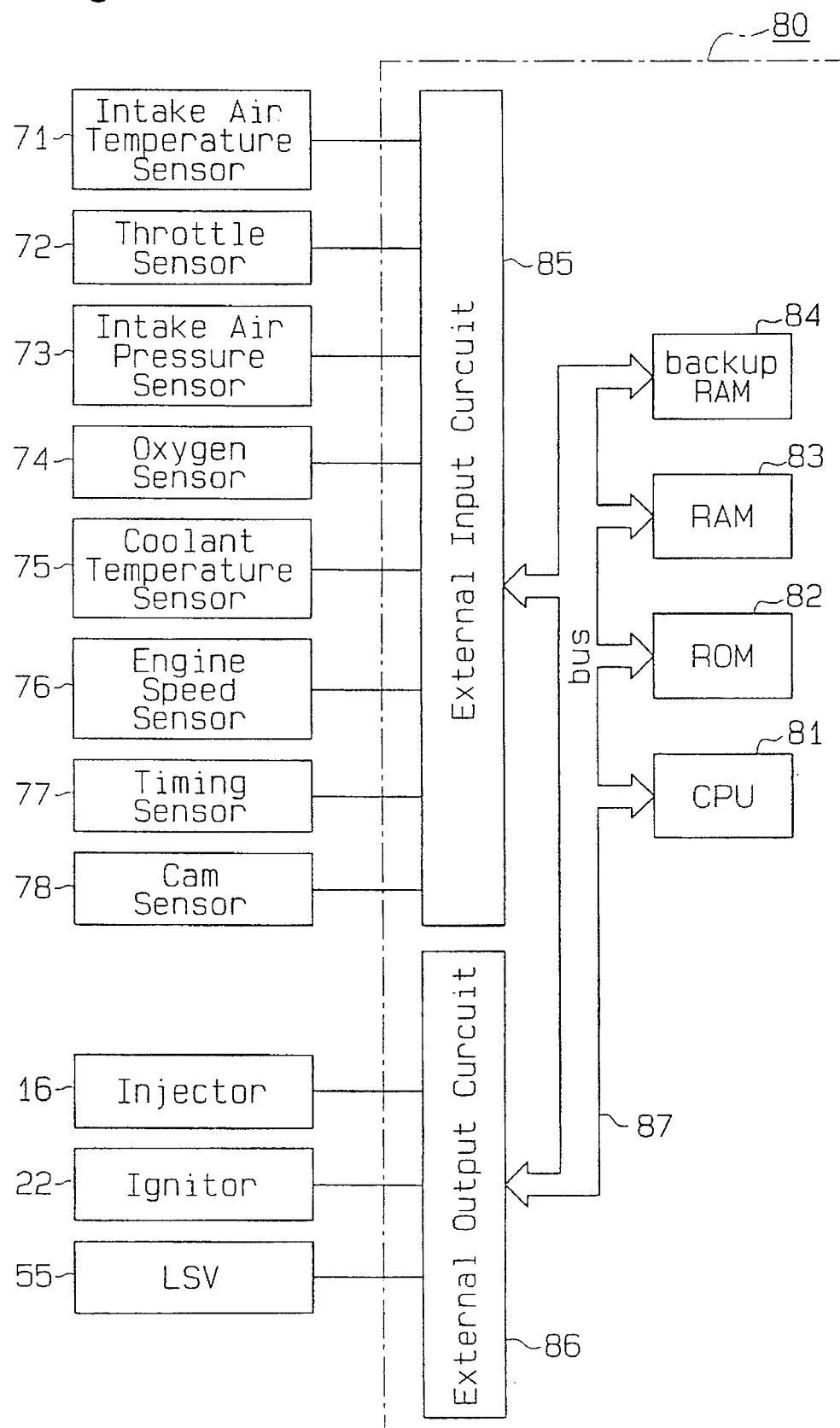
FIG. 4 is a block circuit diagram illustrating the structure of an electronic control unit (ECU)

As shown in the block diagram of FIG. 4, the ECU 80 includes a central processing unit (CPU) 81, a read-only memory (ROM) 82, a random access memory (RAM) 83, and a back-up RAM 84. A logical processing unit is constituted in the ECU 80 by connecting the above members 81-84 to an external input circuit 85, including an analog to digital (A/D) converter and an external output circuit 86, with a bus 87. A predetermined control program is stored in the ROM 82. A processed result of the CPU 81 is temporarily stored in the RAM 83. The back-up RAM 84 saves the stored data. The sensors 71-78 are connected to the external input circuit 85. The members 16, 22, 55 are connected to the external output circuit.

The signals transmitted from the sensors 71-78 through the external input circuit 85 are read by the CPU 81 as input values. The CPU 81 controls the members 16, 22, 55 through fuel injection amount control, ignition timing control, valve timing control, etc. based on the input values.

Fuel injection amount control refers to the adjustment of the amount of fuel supplied to the combustion chamber 4 by controlling each injector 16 with respect to a target value calculated according to the running condition of the engine 1. Ignition timing control refers to the adjustment of the ignition timing of each spark plug 5 by controlling the ignitor 22 with respect to a target value calculated according to the running condition of the engine. Valve timing control refers to the adjustment of the valve timing of the intake valve 8, or the valve overlap, which is performed by the VVT 25, by controlling the LSV 55 with respect to a drive duty ratio DVT used as a target value and calculated according to the running condition of the engine 1.

The valve timing control will be described with reference to FIGS. 6 to 8. A flow chart illustrating the "Valve Timing Control Routine" is illustrated in FIG. 7. The ECU 80 executes this routine periodically for every predetermined time period.

When the processing enters this routine, the ECU 80 reads intake pressure PM, coolant temperature THW, engine speed NE, and actual displacement angle VT based on the signals sent from the sensors 73, 75, 76, 78 at step 105.

At step 110, the ECU 80 judges whether the input coolant temperature THW exceeds a predetermined reference value α. The reference value α is stored in the ROM 82. The reference value α is a predetermined value of the coolant temperature THW for which the so-called port wet amount is substantially the same before and after the valve overlap is switched from a nonexistent state to an overlap state. In this embodiment, the optimum range for the reference value α is 20 to 60 degrees Celsius. To select the appropriate reference value α from the range of 20 to 60 degrees Celsius, the type of the engine and the engine displacement, among other things, should be taken into consideration. Port wet refers to a state in which fuel adheres to the walls of the intake port 6a due to the reversed flow of the air-fuel mixture from the combustion chamber 4. Port wet amount refers to the amount of the adhered fuel.

FIG. 8 shows a graph used to determine the reference value α. The graph shows the relationship between the coolant temperature THW and the port wet amount. The port wet amount produced when there is valve overlap and when it is nonexistent is compared in the graph. The difference between the two port wet amounts changes according to the coolant temperature THW. The difference between the two port wet amounts increases as the temperature decreases and smaller as the temperature increases. When the coolant temperature THW exceeds 60 degrees Celsius, the two port wet amounts become equal. A large difference in the port wet amount results in a large change in the amount of fuel drawn into the combustion chamber 4 before and after the valve timing is switched from a nonexistent state to a state of overlap. As apparent from this graph, the difference between the two port wet amounts is great when the valve timing is switched from a nonexistent state to a state of overlap when the coolant temperature is below zero degrees Celsius. When the valve timing is switched from a non-existing state to an overlapping state when the coolant temperature THW is in the range of 20 to 60 degrees Celsius, the difference in the two port wet amounts is small and insignificant. The temperature range of 20 to 60 coincides with the range in which misfiring does not occur in the engine 1. Therefore, internal exhaust gas recirculation (EGR) may be performed positively and thus the advantageous effects of the internal EGR may be obtained within this range.

If the coolant temperature THW is below the reference value α at step 110, the difference between the port wet amounts are large. Thus, at step 120, the ECU 80 sets the target displacement angle VTT, which controls the VVT 25, at zero degrees. This value corresponds to the negative overlap state in which the valve timing of the intake valve 8 is most retarded, or the valve overlap is forcibly eliminated.

Contrarily, when the coolant temperature THW exceeds the reference value α, the difference between the port wet amounts is small. Thus, the ECU 80 proceeds to step 130.

At step 130, the ECU 80 calculates the target displacement angle VTT based on the values of the intake pressure PM and the engine speed NE. The ECU 80 processes the value of the target displacement angle VTT from the function data shown in FIG. 6. In the function data, the optimum target displacement angle VTT is determined from the relationship between the load LD of the engine 1 and the engine speed NE as illustrated in FIG. 6. The load LD of the engine 1 is obtained from the intake pressure PM and the engine speed NE.

Then, at step 135, the ECU 80 judges whether the value of the calculated target displacement angle is substantially zero degrees, that is, whether the valve timing should be adjusted to a most retarded state, or most retarded timing. When it is determined that the target displacement angle is substantially zero degrees, the ECU 80 proceeds to step 140 to sustain the valve timing at the most retarded timing.

At step 140, the ECU 80 performs "sustaining control of the most retarded timing" by setting the drive duty ratio DVT at a predetermined value γ. The predetermined value γ is obtained through learning. Sustaining control refers to adjustment by the VVT 25 to maintain the displacement angle of the cam shaft 10 at a target displacement value VTT.

The contents of the sustaining control will now be described. The ECU 80 matches the value of the actual displacement angle VT with the value of the target displacement angle VTT by controlling the LSV 55 based on the calculated drive duty ratio DVT. When the values of the actual displacement angle VT and the target displacement angle VTT coincide with each other, the ECU 80 switches the value of the drive duty ratio DVT to be sent to the LSV 55 from a value of the drive duty ratio DVT that displaces the rotational phase of the cam shaft 10 to a value of a sustaining duty ratio DVTH that sustains the rotational phase of the shaft 10. The value of the sustaining duty ratio DVTH corresponds to the command value sent to the LSV 55 that maintains the hydraulic pressure applied to the two pressure chambers 49, 50 by the VVT 25 at the present condition. The ECU 80 determines the sustaining duty ratio DVTH from a sustaining duty learned value GDVTH (described later) to eliminate the effects of tolerances and time-elapsing changes etc. on the LSV 55 and the VVT 25 that are caused by the sustaining duty ratio DVTH. When the ECU 80 adjusts the duty of the LSV 55 based on the sustaining duty ratio DVTH, the displacement angle of the cam shaft 10 is neither advanced nor retarded by the VVT 25 and thus sustained at the value of the target displacement angle VTT just before the initiation of the sustaining control.

"Sustaining control of the most retarded timing" refers to adjustment required to sustain the ring gear 48 inside the VVT 25 at the outermost (leftmost in FIG. 2) farmost position in the most retarded timing direction. To restrict the position of the ring gear 48, the gear 48 may be abutted against the cover 35 with a strong force. However, in this case, a strong force would be necessary when the gear 48 is moved toward the opposite advanced timing side, and the responsiveness would be unsatisfactory. Therefore, the "sustaining control of the most retarded timing" adjusts the hydraulic pressure applied to the two pressure chambers 49, 50 by controlling the ECU 80 and the LSV 55 to obtain satisfactory responsiveness when the gear 48 starts moving toward the advance timing side despite the gear 48 being abutted against the cover 35 with a certain degree of force.

Contrarily, when the value of the target displacement angle VTT is not substantially zero degrees in step 135, the ECU 80 either performs feed back control of the displacement angle of the cam shaft 10 or executes steps 150 to 180 to sustain control the present displacement angle, which is not at the most retarded timing.

That is, at step 150, the ECU 80 judges whether the deviation value (absolute value) of the calculated target displacement angle WT and the actual displacement angle VT is below a predetermined reference value β. In this case, the reference value β is designated as 3 degrees. When the deviation value is larger than the reference value β, the ECU 80 proceeds to step 160.

At step 160, the ECU 80 learns a new sustaining duty learned value GDVTH. That is, the ECU 80 compares the value of the target displacement angle VTT with value of the actual displacement angle VT and raises or lowers the sustaining duty learned value GDVTH, and learns the sustaining duty learned value GDVTH.

When the ECU 80 proceeds to step 170 from the steps 120 or 160, the ECU 80 calculates the drive duty ratio DVT from the next equation.

$$DVT=(VTT-VT)*KP+GDVTH$$

KP indicates a proportional constant, which is multiplied with the difference between the value of the target displacement angle VTT and the actual displacement angle VT to obtain the drive duty ratio DVT. When step 170 is executed after step 120, a value of the drive duty ratio DVT, which results in negative valve overlap, is obtained through the above equation since the value of the target displacement angle VTT is substantially zero degrees. When step 170 is executed after step 160, a value of the drive duty ratio DVT, which results in positive valve overlap, is obtained through the above equation since the value of the drive duty ratio DVT is not zero degrees.

When step 190 is executed after steps 140, 170, or 180, the ECU 80 adjusts the displacement angle of the cam shaft 10 by duty controlling the LSV 55 based on the value of the calculated sustaining duty ratio DVT. The ECU 80 duty controls the LSV 55 by converting the value of the drive duty ratio DVT to an electric current value. This causes the displacement angle of the cam shaft 10 to be adjusted by the VVT 25. As a result, the timing of the intake valve 8 is altered and thus the valve overlap is adjusted. After execution of step 190, the ECU 80 restarts processing from step 105 when the next control routine is commenced.

The operation and effect of the above valve timing control apparatus will now be described. The intake valves 8 and the exhaust valves 9 are moved in synchronism with the rotation of the crank shaft 1a during operation of the engine 1. The movement opens the intake ports 6a and the exhaust ports 7a and enables combustible air-fuel mixture to be supplied to the combustion chambers 4 and exhaust gas to be discharged from the chambers 4. In this state, the ECU 80 refers to the function data, shown in FIG. 6, to calculate the optimum value of the target displacement angle VTT for alteration of the valve timing. The ECU 80 than calculates the drive duty ratio DVT from the processed value of the target displacement angle VTT. The ECU 80 further adjusts the VVT 25 by controlling the LSV 55 based on the value of the target displacement angle VTT. As a result, the valve timing of the intake valve 8 is altered. This causes a valve overlap that is optimum for the running condition of the engine 1.

The VVT 25 is controlled to prolong the range of the positive valve overlap when the engine speed NE is rather high and the load LD is rather large. This improves the charging efficiency of intake air into the combustion chambers 4 utilizing the inertia effect of the intake air in the intake passage 6 and enhances the power of the engine 1. When the engine speed NE is low and the load LD is small, the VVT 25 is controlled to shorten the valve overlap. This reduces the internal EGR inside the combustion chambers 4 and prevents insufficient combustion of the air-fuel mixture. Optimum valve overlap for engine speed NE and load LD, which have a relationship other than the two states described above, is determined to enhance the power of the engine 1 and prevent insufficient combustion of the air-fuel mixture.

The ECU 80 compares the value of the coolant temperature THW with the predetermined reference value $\alpha$ to judge whether the engine 1 is in a low temperature state or not. When it is determined that the engine 1 is in a low temperature condition, the ECU 80 sets the value of the target displacement angle VTT at zero degrees to eliminate valve overlap. The ECU 80 adjusts the VVT 25 by controlling the LSV 55 according to the value of the drive duty ratio DVT calculated from the zero degrees.

Therefore, when the temperature of the engine 1 is low, the valve overlap is nonexistent, and thus a reversed flow of air-fuel mixture from each combustion chamber 4 to its intake port 6a is prevented. This prevents fuel from adhering to the walls of the intake ports 6a, and thus prevents formation of port wet. Preferably, the apparatus is constructed to obtain negative valve overlap so as to positively eliminate valve overlap. Hence, a reversed flow of the air-fuel mixture is substantially eliminated entirely and the formation of port wet is reduced dramatically. As a result, the air-fuel ratio of the air-fuel mixture in the combustion chambers 4 is prevented from changing to an unsatisfactory value. This reduces the hydrocarbon (HC) included in the exhaust gas.

Figure 6:
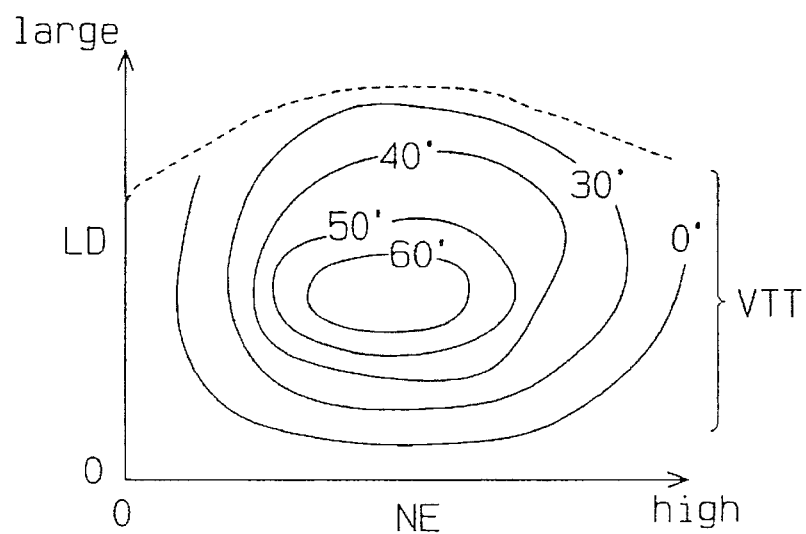
FIG. 6 is a graph showing the function data of target displacement angles.
Figure 7:
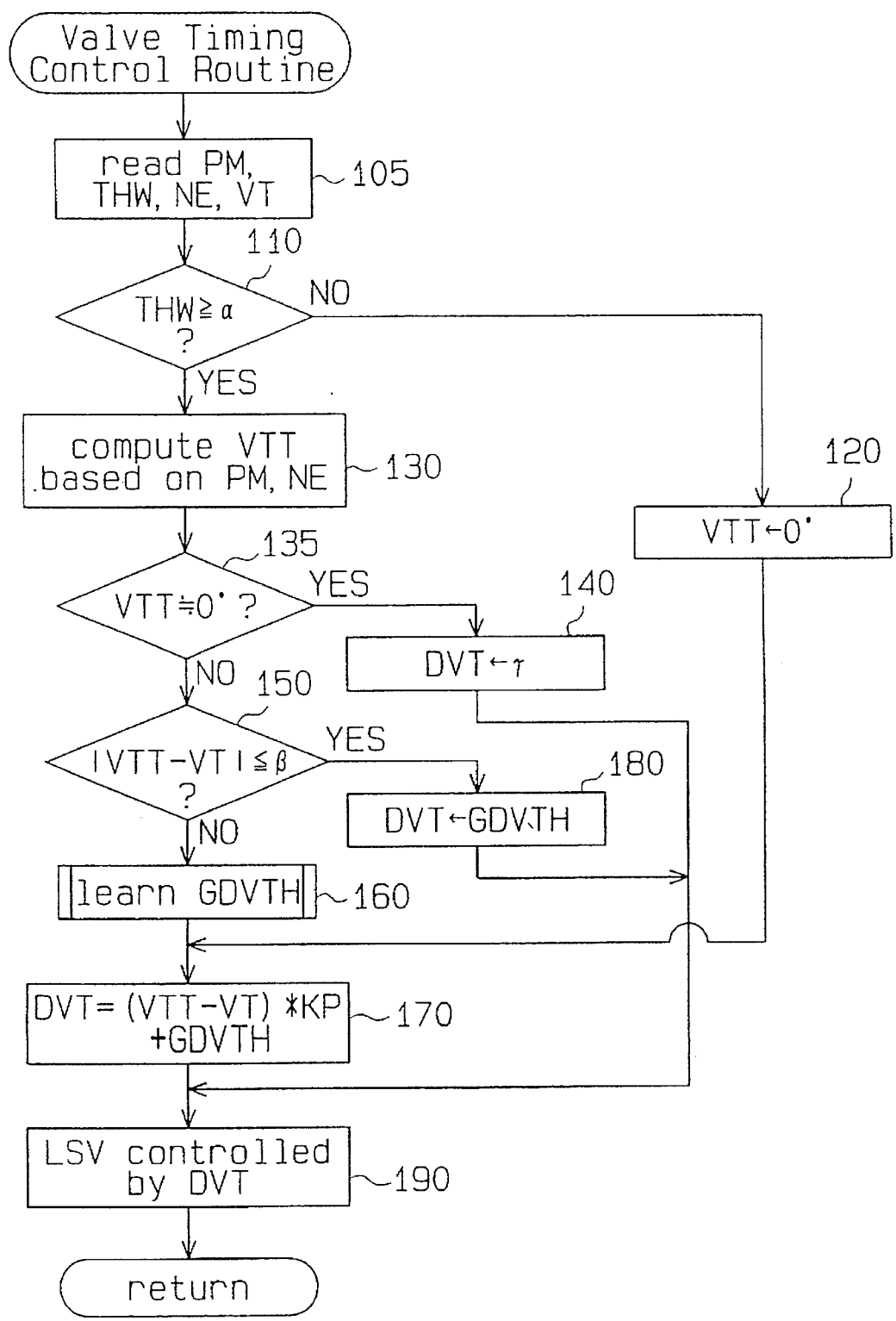
FIG. 7 is a flow chart illustrating a valve timing control routine.
Figure 10:
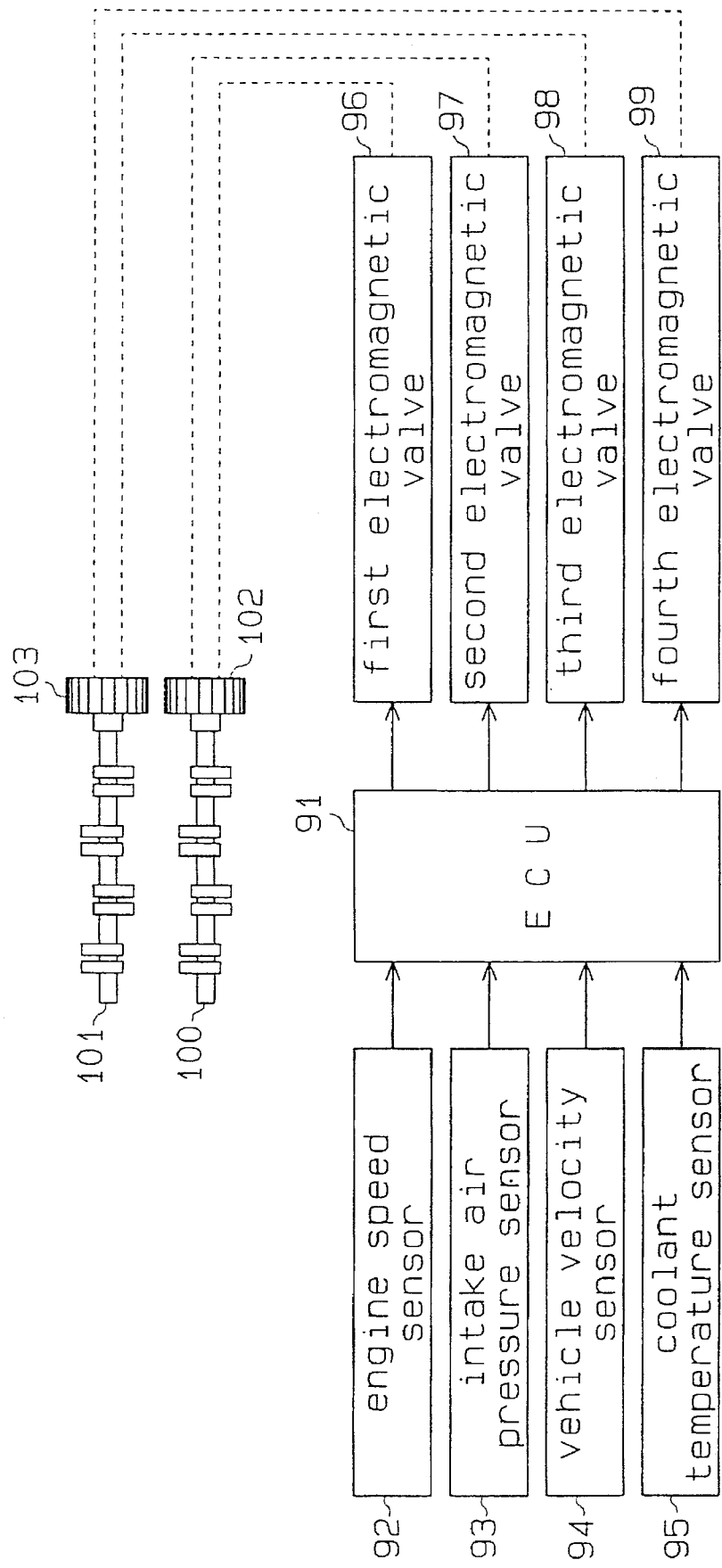
FIG. 10 is a structural diagram showing a prior art valve timing control apparatus.

Contrarily, when the engine 1 increases beyond a low temperature condition to a non-low temperature condition, the ECU 80 calculates the target displacement angle VTT by referring to the function data of FIG. 6 instead of forcibly changing the value of the target displacement value VTT to zero degrees. The ECU 80 then adjusts the VVT 25 by controlling the LSV 55 in accordance with the drive duty ratio DVT calculated from the value of the target displacement angle VTT. This switches the valve timing from a nonexistent state to an overlapped state. The reference value $\alpha$ is predetermined at a value in which the port wet amount, caused by the reversed flow from the combustion chambers 4, is substantially the same before and after the valve timing is switched from a nonexistent state to an overlapped state.

Accordingly, the difference in port wet amount when the valve timing is switched from a nonexistent state to an overlapped state is small and thus prevents a large difference in the amount of fuel supplied to the combustion chambers before and after the switching. As a result, when the valve timing is switched from a nonexistent state to an overlapped state, the air-fuel ratio of the mixture in each combustion chamber 4 is prevented from fluctuating or changing to an unsatisfactory value. From this viewpoint, a degradation in the performance and emissions of the engine 1 is prevented.

Furthermore, in this embodiment, since the ECU 80 executes sustaining control when necessary, the displacement angle of the cam shaft 10, which is altered by the VVT 25, is stably maintained at a value of the target displacement angle VTT just before sustaining control is started. In addition, the ECU 80 determines the sustaining duty ratio DVTH used in the sustaining control in accordance with the sustaining duty learned value GDVTH. Thus, the effects of dimensional tolerances and time-elapsing changes etc. on the LSV 55 and the VVT 25, which are caused by the sustaining duty ratio DVTH, are eliminated. This allows execution of sustaining control to be optimum constantly.

Additionally, in this embodiment, the ECU 80 also uses the sustaining duty learned value GDVTH as a parameter to calculate the drive duty ratio DVT when feedback control, excluding the sustaining control, is performed. Thus, the effects of tolerances and time-elapsing changes etc. on the LSV 55 and the VVT 25, which are caused by the sustaining duty ratio DVTH, are also eliminated during feedback control. This allows execution of feedback control to be optimum constantly.

Although only one embodiment of the present invention has been described so far, it should be apparent to those skilled in the art that the present invention may be embodied in many other specific forms without departing from the spirit or scope of the invention. Particularly, it should be understood that the present invention may also be modified as described below.

In the illustrated embodiment, the valve overlap is adjusted by changing the valve timing of only the intake valve 8 with the VVT 25, which is provided in the intake side of the cam shaft 10. However, the valve overlap may be adjusted by changing the valve timing of the exhaust valve 9 with the VVT. In another case, a VVT may be provided for each cam shaft 10, 11 of both intake and exhaust sides to alter the valve overlap by changing the valve timing of both valves 8, 9.

In the illustrated embodiment, the VVT 25 is driven by hydraulic pressure. However, a VVT employing electric actuators such as step motors may be employed instead.

Sustaining control and learning of the sustaining duty learned value are executed in the "valve timing control routine" in the above embodiment. However, these processes may be eliminated from the control routine.

The illustrated embodiment is constituted in a manner such that a negative valve overlap is obtained by forcibly eliminating the valve overlap. However, the valve overlap may be set to obtain a zero value. That is, the valve overlap may be adjusted in a manner such that the opening of the intake valve 8 begins exactly when the closing of the exhaust valve 9 is completed or vice-versa.

In the illustrated embodiment, the value of the target displacement angle VVT is calculated by using the intake pressure PM and the engine speed ME as parameters when the temperature of the engine 1 is above the low temperature condition. However, the value of the target displacement angle VVT may be calculated by using the intake pressure PM, the engine speed NE, and also the throttle opening TA as parameters when the engine temperature is above the low temperature state.

The illustrated embodiment employs a VVT 25 that enables continuous alteration of the valve timing. However, a VVT that switches the valve timing by positioning the ring gear 48 at two positions, an advanced timing side position and a retarded timing side position, may be employed.

Therefore, the present examples and embodiments are to be considered as illustrative and not restrictive and the invention is not to be limited to the details given herein, but may be modified within the scope of the appended claims.

What is claimed is:

1. A valve timing control apparatus for an engine having a combustion chamber for combusting a mixture of fuel mist and air therein, an air intake passage for introducing the air to a combustion chamber and exhaust passage for exhausting gas from the combustion chamber, said passages respectively having an intake valve and an exhaust valve therein, and said intake valve and said exhaust valve being actuated in synchronism with the rotation of a crank shaft of the engine to be alternately opened and closed to regulate introduction of the air to and exhausting of the gas from the combustion chamber and to be simultaneously open during a valve overlap period causing a reverse flow of the air-fuel mixture from the combustion chamber to the air intake passage, wherein the fuel mist adheres to an inner surface of the air intake passage; said apparatus comprising:

adjusting means for adjusting the valve timing at least one of the intake valve and the exhaust valve to obtain a valve overlap mode in which the valve timing is optimized and a non-overlap mode in which valve overlap is eliminated;

condition detecting means for detecting a running condition of the engine;

first control means for controlling the adjusting means to operate within the valve overlap mode based on said detected running condition;

temperature detecting means for detecting a temperature of the engine;

second control means for controlling said adjusting means to operate in said non-overlap mode when the detected engine temperature is below a predetermined value; and selecting means for selecting the valve overlap mode in place of the non-overlap mode by deactivating the second control means and actuating the first control means when the detected temperature is in excess of the predetermined value, wherein said predetermined value is based on a value selected such that the adhered fuel mist is substantially unchanged in amount before and after the valve timing is changed to the overlap mode from the non-overlap mode.

2. The apparatus according to claim 1, wherein said adjusting means includes:

a cam shaft rotatable in association with the crank shaft for actuating at least one of the intake valve and the exhaust valve;

a timing pulley provided on said cam shaft for transmitting torque of the crank shaft to the cam shaft;

a ring gear for coupling the cam shaft to the timing pulley to cause a rotational phase difference between the cam shaft and the timing pulley based on movement of the ring gear in an axial direction thereof; and means for supplying hydraulic pressure to the ring gear to drive the ring gear.

3. The apparatus according to claim 2, wherein said second control means controls said adjusting means to keep the intake valve closed for a predetermined period after the exhaust valve is closed to eliminate the valve overlap.

4. The apparatus according to claim 2, wherein said second control means computes a period for eliminating the valve overlap, and wherein the second control means controls said adjusting means to keep the intake valve closed for computed period after the exhaust valve is closed.

5. The apparatus according to claim 3, wherein said condition detecting means includes:

a first sensor for detecting a rotation speed of the crank shaft; and a second sensor for detecting an air intake pressure in said air intake passage.

6. The apparatus according to claim 5, wherein said first control means computes a target value of the valve timing based on said detected rotation speed of the crank shaft and said detected air intake pressure in the intake passage, and wherein said first control means controls said adjusting means based on said computed target value.

7. The apparatus according to claim 5, wherein said condition detecting means further includes a third sensor for detecting the actual valve timing adjusted by said adjusting means.

8. The apparatus according to claim 7, wherein said first control means computes a target value of the valve timing based on said detected rotation speed of the crank shaft, detected air intake pressure in the intake passage, and wherein said first control means controls said adjusting means to conform said detected actual valve timing to said computed target value.

9. The apparatus according to claim 8, wherein said first control means, said second control means, and said selecting means constitute an electronic control unit having an input signal circuit, a memory, an operation circuit and an output signal circuit.

10. A valve timing control apparatus for an engine having a combustion chamber for combusting a mixture of fuel mist and air therein, an air intake passage for introducing the air to a combustion chamber and exhaust passage for exhausting gas from the combustion chamber, said passages respectively having an intake valve and an exhaust valve therein, and said intake valve and said exhaust valve being actuated in synchronism with the rotation of a crank shaft of the engine to be alternately opened and closed to regulate introduction of the air to and exhausting of the gas from the combustion chamber and to be simultaneously open during a valve overlap period causing a reverse flow of the air-fuel mixture from the combustion chamber to the air intake passage, wherein the fuel mist adheres to an inner surface of the air intake passage; said apparatus comprising:

adjusting means for adjusting the valve timing at least one of the intake valve and the exhaust valve to obtain a valve overlap mode in which the valve timing is optimized and a non-overlap mode in which valve overlap is eliminated;

temperature detecting means for detecting a temperature of the engine;

first control means for controlling the adjusting means to operate within the valve overlap mode;

second control means for controlling said adjusting means to operate in said non-overlap mode when the detected engine temperature is below a predetermined value; and wherein said predetermined value is based on a value selected such that the adhered fuel mist is substantially unchanged in amount before and after the valve timing is changed to the overlap mode from the non-overlap mode.

11. The apparatus according to claim 10, wherein said adjusting means includes:

a cam shaft rotatable in association with the crank shaft for actuating at least one of the intake valve and the exhaust valve;

a timing pulley provided on said cam shaft for transmitting torque of the crank shaft to the cam shaft;

a ring gear for coupling the cam shaft to the timing pulley to cause a rotational phase difference between the cam shaft and the timing pulley based on movement of the ring gear in an axial direction thereof; and means for supplying hydraulic pressure to the ring gear to drive the ring gear.

12. The apparatus according to claim 11, wherein said second control means controls said adjusting means to keep the intake valve closed for a predetermined period after the exhaust valve is closed to eliminate the valve overlap.

13. The apparatus according to claim 11, wherein said second control means computes a period for eliminating the valve overlap, and wherein the second control means controls said adjusting means to keep the intake valve closed for computed period after the exhaust valve is closed.

14. The apparatus according to claim 12, wherein said first control means and said second control means constitute an electronic control unit having an input signal circuit, a memory, an operation circuit and an output signal circuit.

15. A valve timing control apparatus for an engine having a combustion chamber for combusting a mixture of fuel mist and air therein, an air intake passage for introducing the air to a combustion chamber and exhaust passage for exhausting gas from the combustion chamber, said passages respectively having an intake valve and an exhaust valve therein, and said intake valve and said exhaust valve being actuated in synchronism with the rotation of a crank shaft of the engine to be alternately opened and closed to regulate introduction of the air to and exhausting of the gas from the combustion chamber and to be simultaneously open during a valve overlap period causing a reverse flow of the air-fuel mixture from the combustion chamber to the air intake passage, wherein the fuel mist adheres to an inner surface of the air intake passage; said apparatus comprising:

adjusting means for adjusting the valve timing at least one of the intake valve and the exhaust valve to obtain a valve overlap mode in which the valve timing is optimized and a non-overlap mode in which valve overlap is eliminated;

condition detecting means for detecting a running condition of the engine;

temperature detecting means for detecting a temperature of the engine;

first computing means for computing a first target value of the valve timing to operate within the valve overlap mode based on said detected running condition when the detected engine temperature is above a predetermined value;

second computing means for computing a second target value of the valve timing to operate within the non-overlap mode when the temperature is below said predetermined value;

control means for controlling said adjusting means based on one of said first target value and said second target value;

wherein said predetermined value is based on a value selected such that the adhered fuel mist is substantially unchanged in amount before and after the valve timing is changed to the overlap mode from the non-overlap mode.

16. The apparatus according to claim 15, wherein said adjusting means includes:

a cam shaft rotatable in association with the crank shaft for actuating at least one of the intake valve and the exhaust valve;

a timing pulley provided on said cam shaft for transmitting torque of the crank shaft to the cam shaft;

a ring gear for coupling the cam shaft to the timing pulley to cause a rotational phase difference between the cam shaft and the timing pulley based on movement of the ring gear in an axial direction thereof; and means for supplying hydraulic pressure to the ring gear to drive the ring gear.

17. The apparatus according to claim 16, wherein said condition detecting means includes:

a first sensor for detecting a rotational speed of the crank shaft; and a second sensor for detecting a air intake pressure in said air intake passage.

18. The apparatus according to claim 17, wherein said first computing means computes said first target value based on said detected rotation speed of the crank shaft and said detected air intake pressure in the intake passage.

19. The apparatus according to claim 17, wherein said condition detecting means further includes a third sensor for detecting the actual valve timing adjusted by said adjusting means.

20. The apparatus according to claim 19, wherein said first computing means computes said first target value of the valve timing based on said detected rotation speed of the crank shaft, detected air intake pressure in the intake passage.

21. The apparatus according to claim 20, wherein said control means controls said adjusting means to conform said detected actual valve timing to said computed first target value.

22. The apparatus according to claim 21, wherein said first computing means, said second computing means and said control means constitute an electronic control unit having an input signal circuit, a memory, an operation circuit and an output signal circuit.

* * * * *

UNITED STATES PATENT AND TRADEMARK OFFICE
CERTIFICATE OF CORRECTION

PATENT NO. : 5,626,109  
DATED : 6 May 1997  
INVENTOR(S) : Atsushi YASUMURA et al.

Page 1 of 2

It is certified that error appears in the above-indentified patent and that said Letters Patent is hereby corrected as shown below:

In the Abstract: Line 6: After "accordance" change "to" to --with--.

| Column | Line | |
|---|---|---|
| 3 | 7 | After "timing" insert --of--. |
| 5 | 11 | Change "ME" to --NE--. |
| 7 | 53 | Change "B," to --8,--. |
| 10 | 10 | After "duty" insert --ratio--. |
| 10 | 38 | Change "WT" to --VTT--. |
| 10 | 55 | Change "with" to --by--. |
| 12 | 30 | Change "WT" to --VVT--. |
| 12 | 58 | Change "WT" to --VVT--. |

UNITED STATES PATENT AND TRADEMARK OFFICE
CERTIFICATE OF CORRECTION

PATENT NO. : 5,626,109
DATED : 6 May 1997
INVENTOR(S) : Atsushi YASUMURA et al.

It is certified that error appears in the above-indentified patent and that said Letters Patent is hereby corrected as shown below:

| Column | Line | |
|--------|------|---|
| 13 | 6 | Change "VVT" to --VTT--. |
| 13 | 9 | Change "VVT" to --VTT--. |
| 14 | 61 | Before "at least" insert --of--. |
| 15 | 54 | Before "at least" insert --of--. |
| 16 | 38 | Before "air" change "a" to --an--. |
| 16 | 51 | Before "detected" insert --and--. |

Signed and Sealed this

Twenty-first Day of October 1997

Attest:

BRUCE LEHMAN

Attesting Officer

Commissioner of Patents and Trademarks